United States Patent Office 2,991,157
Patented July 4, 1961

2,991,157
POLYMERIZATION CATALYSTS

Adam Orzechowski, Brookline, and James C. MacKenzie, Wellesley Hills, Mass., assignors to Cabot Corporation, Boston, Mass., a corporation of Delaware
No Drawing. Filed Dec. 31, 1958, Ser. No. 784,038
15 Claims. (Cl. 23—230)

This application relates to polymerization reactions carried out with the aid of a catalyst. In particular, the present invention comprises a process for producing improved catalysts.

The present case is a continuation-in-part of U.S. Application, Serial No. 730,519, by Orzechowski et al., filed April 24, 1958, now abandoned.

The polymerization of various monomers by means of active catalyst systems has of late become of considerable commercial importance. However, although enormous sums of money and effort have been expended on research directed to all phases of polymer production, the use of such catalysts in this field still presents numerous problems.

Heretofore, for example, it has been extremely difficult if not impossible to produce small quantities of catalyst in a solvent solution or in the presence of a liquid diluent in which the ratio of the various components of the catalyst to each other was substantially correctly ascertainable. Careful determination of the concentration of the active ingredients of the various components of the catalyst utilized was of no avail because of the tendency for residual impurities in the solvent to react with and destroy or deactivate a portion of one or more of the components of the catalyst.

The present invention provides a process for remedying this extremely disadvantageous situation existing in the prior art.

Accordingly, it is a principal object of the instant invention to provide an improved process for the production of catalysts suitable for use in polymerization reactions.

Another object of the invention is to provide a method for determining accurately yet easily, the total impurities that can react with a catalyst that are present in a hydrocarbon medium.

Another object of the present invention is to provide a means for producing a catalyst in a hydrocarbon medium, in which the ratio of the various components of the catalyst to each other is substantially accurately known.

Still another object of the invention is to provide an improved process for neutralizing the harmful impurities in a hydrocarbon medium in which the catalyst is subsequently to be formed.

Still another object of the invention is to provide a process for producing increased yields of polyethylene from a given quantity of catalyst.

Other objects of the invention will in part be obvious and will in part appear hereinafter.

For a better understanding of the present invention, reference should be made to the following detailed description.

The catalysts of the present invention are formed by reaction of an organometallic compound with: (a) an organometallic-reducible compound of a transition metal or (b) a previously reduced compound of a transition metal. The organometallic compounds of the present invention have the general formula:

$$MR_xP_{n-x}$$

where:

M represents a metal
n is the valence of the metal
R is a hydrocarbon radical
x can be any value from 1 to n
P is hydrogen or halogen The preferred transition metal compounds are the compounds of the group IVa, Va or VIa metals and in particular the halides of the group IVa, Va or VIa metals.

In the interests of clarity and brevity, only $TiCl_4$ and aluminum alkyls are initially mentioned as components of the catalysts of the present invention. Clearly, many other transition metal compounds such as $VOCl_3$, $ZrCl_4$, $CrOCl_2$, and organometallic compounds such as zinc alkyls, lithium aryls, tetraethyl lead, tin tetraphenyl and chloromagnesium alkyls are equally suitable for the purposes of the present invention. Accordingly, it is desired that it be clearly understood that, $TiCl_4$ and the aluminum alkyls are utilized merely as specific examples for the purposes of illustration and it is not intended to thereby limit the present invention in any way. Also for the sake of brevity, only the terms, "organometallic compound" and "organometallic" are used hereinafter in the specification and the claims to denote the organometallic compounds of the present invention. However, these terms should be understood to refer to organometallic compounds fulfilling the formula set forth above. Also, the term, "transition metal compound," as used hereinafter in the specification and the claims, should be understood to refer to an organometallic-reducible compound of a transition metal and the term, reduced transition metal compound, should be understood to refer to a reduced compound of a transition metal.

Suitable solvents or diluents for the purposes of the present invention comprise any hydrocarbon medium such as cycloheptane, benzene, isooctane, etc., including media comprising condensed monomers such as liquid ethylene. In the interests of brevity only the term, solvent, is utilized hereinafter in the specification but it should be clearly understood that the term, "solvent," refers to a hydrocarbon medium as defined above whether said medium acts as a solvent or a diluent.

The extreme sensitivity of catalyst systems such as the triisobutylaluminum-$TiCl_4$ system, towards impurities such as oxygen, water, and the like renders the utilization of these catalyst systems very difficult. Extreme precautions of purity and cleanliness must be observed in the preparation and handling of these catalysts if their production is to be crowned with success. Notwithstanding elaborate precautions, however, minute but significant quantities of impurities almost invariably contaminate the solvent in which the catalyst is to be formed. Though the quantity of the impurities present in the solvent is usually insufficient to completely destroy or deactivate the catalyst (if the elaborate precautions heretofore mentioned are observed), they are nevertheless sufficient to partially destroy or deactivate one or more of the catalyst components thereby making accurate prior determination of the ratio of said components to each other substantially impossible. Accurate control of this ratio is of great importance since many of the characteristics and properties of a given catalyst, such as efficiency, resistance to aging, and type of polymer produced are very sensitive to small changes in this ratio.

In accordance with the present invention, it was discovered that although the organometallic compound-transition metal compound catalyst system is as a whole extremely reactive towards harmful impurities, the organometallic component is considerably more reactive towards these impurities than the other components and products of the system. It was also discovered that the catalyst impurities in the solvent can be substantially accurately determined as follows:

The impure solvent is titrated by adding thereto increments of a standard solution of an organometallic compound, such as aluminum alkyl, each increment being followed by the addition of a drop or so of a transition metal compound. So long as excess unreacted or unneutralized impurities remain in the system, no color change occurs. When, however, the impurities in the solvent solution are completely neutralized and a very slight excess of the organometallic compound exists in the solution any transition metal compound added thereafter is reduced; the resulting reduced transition metal compound causes a color change in the solution. Accordingly, it is relatively easy to determine when complete neutralization of the impurities in the solution has taken place. Subsequent to complete neutralization, a catalyst can be formed in the solution with the assurance that very little if any of the components of the catalyst will be deactivated or destroyed by impurities. The ratio of the catalyst components to each other can accordingly thereafter be substantially accurately determined by determining the concentration of the components to be utilized prior to their addition to the solvent.

By a modification of the above procedure, super pure solvent can be obtained. This modification comprises distilling under nitrogen (and preferably in the presence of a small amount of an organometallic compound) a solvent solution in which the impurities have been neutralized as described above. The impurities (and the organometallic compound if utilized) are thereby left behind and a very pure solvent distillate obtained.

There follow a number of non-limiting illustrative examples:

It should be pointed out initially that although only one example of each run is given below, these runs were shown to be highly reproducible and therefore meaningful.

*Example 1*

Under an atomsphere of nitrogen, 100 cc. of isooctane was charged into an air-tight flask which had been dried at 100° C. for 2 hours and subsequently flamed. The isooctane was stirred violently and ethylene was introduced into the flask, until the isooctane had become substantially saturated therewith. 22.5 mg. of titanium tetrachloride, followed in 0.3 minute by 65.6 mg. of triisobutylaluminum, was then introduced into the flask. Ethylene was then continuously introduced into the flask and the isooctane stirred until the reaction had substantially ceased. All the ethylene utilized in the experiment had been previously purified by being bubbled through triisobutylaluminum. The temperature of the flask and its contents at the commencement of the reaction was 30° C. The run lasted 90 minutes. 9.2 grams of polyethylene was produced.

*Example 2*

This example was a duplicate of Example 1 except that prior to the addition of the catalyst components (triisobutylaluminum and titanium tetrachloride) to the flask, the isooctane was titrated with increments of triisobutylaluminum, each increment being followed by a drop of titanium tetrachloride. The end point, which was signified when the colorless solution turned a yellowish color was reached after the addition of 30 mg. of triisobutylaluminum. Subsequently, when the catalyst was formed in the solvent solution as in Example 1, the polymerization reaction was continued for 95 minutes and produced 20.7 grams of polyethylene.

In accordance with the present invention, it was also discovered that although the catalyst systems of the present invention are as a whole extremely reactive towards harmful impurities, and although the organometallic component of these catalyst systems is more reactive towards these impurities than the other components and products of the system, the transition metal compound component of the catalyst system is relatively highly reactive towards the most commonly encountered of these impurities, water. The reaction between the transition metal compound component of the catalyst and water proceeds rather more slowly than the parallel reaction involving the organometallic component, but, is substantially as complete.

Accordingly, since the organometallic compound is, in general, a substantially more expensive commodity than is the transition metal compound, the economics of the particular situation, in particular, when water constitutes all or a major portion of the impurities present in a solvent, might well favor the use of the less expensive commodity in neutralizing the harmful impurities. In this event, the solvent would be neutralized as follows:

Increments of a solution of a transition metal compound are added to the impure solvent, each increment being followed after the elapse of a period of time, with a drop or so of an organometallic compound. So long as excess unreacted or unneutralized impurities remain in the solvent solution, no color change occurs. When, however, the water in the solvent solution is completely neutralized and a very slight excess of transition metal compound exists in the solution, any organometallic compound added thereafter reduces the excess transition metal compound and causes a color change in the solution. Accordingly, it is relatively easy to determine when complete neutralization of the impurities in the solution has taken place. Subsequent to complete neutralization, a catalyst can be formed in the solution with the assurance that very little if any of the components of the catalyst will be deactivated or destroyed by water or moisture. The ratio of the catalyst components to each other can accordingly thereafter be substantially accurately determined by determining the concentration of the components to be utilized prior to their addition to the solvent.

By a modification of the above procedure, super pure solvent can be obtained. This modification comprises deaerating and then distilling under nitrogen in the presence of a small amount of a transition metal compound a solvent solution in which the impurities have been neutralized as described above. The impurities are thereby left behind and a very pure solvent distillate obtained.

It should be pointed out that although the examples specifically relate to the polymerization of ethylene, the process of the present invention is equally suitable for use in the polymerization of other monomers such as propylene, butene and butadiene and copolymers thereof. Also, it should be pointed out that the use of isooctane as a solvent in the reaction is not critical. Other hydrocarbon media which are in the various components and products of the polymerization system and are preferably (but not necessarily) substantially colorless or only lightly colored such as heptane, and cyclohexane and many other liquid hydrocarbons are equally suitable for the purposes of the present invention.

The present invention lends itself well to applications other than those specifically described above. For example, in one embodiment of the invention, free organometallic compounds can be determined quantitatively by titrating therewith a standard solution containing known amounts of impurities. Such a solution can be standardized by following the above-described process (i.e. titrating against a known organometallic compound solution). However, it is very difficult to keep such standardized solutions for any length of time without some change in the amount of impurities contained therein. Accordingly, in a preferred embodiment of the invention, isopropanol is used as the sole "impurity" ingredient. The procedure is as follows:

A small amount of a solution of a transition metal compound is added as the indicator to a standard solution of isopropanol in isooctane. The isopropanol solution is then titrated with the solution containing the unknown amounts of organometallics. The organometallics react selectively and stoichiometrically in a 1:1 molar ratio with the free isopropanol. The transition metal compound in the solution complexes with isopropanol and is not attacked by the organometallics until all the free (uncomplexed) isopropanol in the solution has reacted with organometallics. When, finally, all the free isopropanol in the solution has reacted with organometallics, and a very slight excess of free organometallics exists in the solution, the transition metal compound-isopropanol complex is broken, and the transition metal compound is reduced thereby causing a color change in the solution and signifying the end point of the titration. The reduction of the transition metal compound and the concomittant color change therefore indicate when all the free isopropanol has been titrated. Of course, due to complexing, the transition metal compound which serves as the indicator renders some of the isopropanol unreactive with the organometallics, but the quantity of isopropanol thus removed from the titration reaction is comparatively so small (because only a small amount of the transition metal compound need be added to the solution) that for most purposes, it can be disregarded. However, if absolute accuracy is desired, it can be obtained by a simple calculation because it has been established that the transition metal compounds stoichiometrically complex with the isopropanol, for example, in a molar ratio of two moles of isopropanol to one mole of said transition metal compound. This knowledge allows calculation of the quantity of isopropanol removed from the titration reaction by the transition metal compound (assuming of course the amount of transition metal compound utilized as indicator is measured). A non-limiting example follows:

Example 3

A small amount (0.18 ml. of a 0.0276 molar solution in isooctane) of $TiCl_4$ was added to 10.8 ml. of a 0.0485 molar solution of isopropanol in isooctane (containing $522 \times 10^{-6}$ moles of isopropanol). The mixture was then titrated with a solution containing an unknown amount of $Al-(isobutyl)_2H$ until a color change was observed. At the point when the color change was observed, 1.09 ml. of $Al-(isobutyl)_2H$ solution had been added. The indicated molarity of the $Al-(isobutyl)_2H$ solution was accordingly calculated to be 0.47. The actual molarity of the solution was subsequently determined by well-established analytical methods and found to be 0.45 indicating the high accuracy of the colorimetric titration method of this invention.

Example 4

A very small amount of titanium tetrachloride in isooctane slution was added to 10.8 ml. of a 0.0485 molar solution of isopropanol in isooctane. This solution was then titrated with a triisobutylaluminum-isooctane solution of unknown strength until a color change was observed. At the point of the color change, 4.47 ml. of the triisobutylaluminum solution had been added. The indicated molarity of the triisobutylaluminum was accordingly calculated to be 0.118. Determination by well-established analytical methods gave a value of 0.116.

Compounds of the transition metals of the present invention can be determined by utilizing a standard solution of an organometallic and a standard solution of isopropanol. As mentioned above in connection with Examples 3 and 4, it was discovered that when a compound of a transition metal (and preferably a halide of a group IVa, Va and VIa metal) is added to an isopropanol solution, the metal compound stoichiometrically complexes with the isopropanol. In the example given above the ratio in each case was two moles of isopropanol to one mole of the said transition metal compound. (It should be pointed out that this ratio is not necessarily 2:1 for every combination of isopropanol and a transition metal compound, but the ratio in any combination can be readily determined.) Also, as mentioned above, when subsequently this solution which now contains free isopropanol and isopropanol complexed with the transition metal compound, is titrated with a solution of an organometallic compound, the organometallic reacts preferentially with the free isopropanol. When finally, all the free isopropanol has reacted with the organometallic compound, the introduction into the solution of an additional small quantity of the organometallic compound causes the isopropanol-transition metal compound complex to deocmpose, whereupon the organometallic compound reacts with the transition metal compound to produce a color change. Accordingly, it was discovered that the concentration of the transition metal compound of the present invention in a solution can be quantitatively determined if a standard solution of isopropanol and a standard solution of an organometallic compound are available. A non-limiting example follows:

Example 5

0.50 ml. of $VOCl_3$-isooctane solution of unknown molarity was added to 3.00 ml. of an isopropanol-isooctane solution having an isopropanol molarity of 0.0485. This solution was then titrated with triisobutylaluminum solution having a molarity of 0.116 until a color change was observed. At the point of the color change, 0.22 ml. of the triisobutylaluminum solution had been added. Since triisobutylaluminum reacts with isopropanol stoichiometrically in a 1:1 molar ratio, the addition of 0.22 ml. of the triisobutylaluminum solution prior to the occurrence of a color change indicated that there had been in the titrated solution, $25 \times 10^{-6}$ moles of free isopropanol. Since there had originally been $174 \times 10^{-6}$ moles of isopropanol in the solution, it was indicated that $149 \times 10^{-6}$ moles of isopropanol were complexed with $VOCl_3$. Accordingly, since the isopropanol-$VOCl_3$ complex involves a 2:1 molar ratio (2 moles of isopropanol to 1 mole of $VOCl_3$), the amount of $VOCl_3$ in 0.50 ml. of isooctane solution was indicated to be $74.5 \times 10^{-6}$ moles, and the $VOCl_3$ concentration in the solution was indicated to be 0.149 molar. Independent, well-established analytical methods disclosed the actual concentration to be 0.147. The difference in the two results is less than 1.5% or well within the estimated limits of experimental error involved.

Obviously many changes can be made in the above-described procedures without departing from the scope of the invention. Accordingly, it is intended that the above disclosure be regarded as illustrative and as in no way limiting the scope of the invention.

What we claim is:

1. A process for determining the concentration of free metal alkyl present in a hydrocarbon medium which comprises colorimetrically titrating a standard solution of isopropanol with said alkyl containing medium in the presence of an indicator comprising a metal alkyl-reducible halide of a metal chosen from the group consisting of the group IVa, Va and VIa metals.

2. A process for determining the concentration of free aluminum alkyl present in a hydrocarbon medium which comprises colorimetrically titrating a standard solution of isopropanol with said alkyl containing medium in the presence of an indicator comprising titanium tetrachloride.

3. A process for determining the concentration of free aluminum alkyl present in a solution which comprises colorimetrically titrating a standard solution of isopropanol with said alkyl solution in the presence of an indicator comprising titanium tetrachloride.

4. In a process for producing in a hydrocarbon medium a catalyst having a desired ratio of components, said catalyst comprising a metal alkyl and a metal alkyl-reducible halide of a metal chosen from the group consisting of the group IVa, Va and VIa metals, the steps of colorimetrically titrating said hydrocarbon medium prior to forming said catalyst therein with a standard solution of a metal alkyl, utilizing as an indicator a metal alkyl-reducible halide of a metal chosen from the group consisting of the group IVa, Va and VIa metals.

5. A process for neutralizing the metal alkyl consuming impurities in a hydrocarbon medium which process comprises colorimetrically titrating said medium with a solution of a metal alkyl utilizing as an indicator a metal alkyl-reducible halide of a metal chosen from the group consisting of group IVa, Va and VIa metals.

6. The process of claim 5 wherein said solution of a metal alkyl comprises a solution of triisobutylaluminum, and wherein said indicator comprises titanium tetrachloride.

7. A process for purifying a hydrocarbon medium of metal alkyl utilizing as an indicator a metal alkyl-reducible colorimetrically titrating said medium with a solution of a metal alkyl utilizing as an indicator a metal alkyl-reducible halide of a metal chosen from the group consisting of group IVa, Va and VIa metals, and subsequently distilling said hydrocarbon medium under an inert atmosphere.

8. A process for determining the concentration of free metal alkyl present in a hydrocarbon medium which comprises colorimetrically titrating a standard solution of isopropanol with said metal alkyl containing medium, utilizing as an indicator a metal alkyl-reducible halide of a metal chosen from the group consisting of the group IVa, Va and VIa metals.

9. The process of claim 8 wherein said metal alkyl comprises triisobutylaluminum and said indicator comprises titanium tetrachloride.

10. A process for determining the concentration in a solution of a metal alkyl-reducible halide of a metal chosen from the group consisting of the group IVa, Va and VIa metals, which comprises providing a standard solution of isopropanol, combining said isopropanol solution with said solution containing the metal halide to be determined, and colorimetrically titrating the combined solutions with a standard solution of a metal alkyl.

11. A process for determining the concentration in a solution of titanium tetrachloride which comprises providing a standard solution of isopropanol, combining said isopropanol solution with the solution of titanium tetrachloride, and colorimetrically titrating the combined solutions with a standard solution of a metal alkyl.

12. A process for neutralizing in a hydrocarbon medium those impurities which react with a metal alkyl-reducible halide of a metal chosen from the group consisting of group IVa, Va and VIa metals which process comprises colorimetrically titrating said hydrocarbon medium with a solution of a metal alkyl-reducible halide of a metal chosen from the group consisting of group IVa, Va and VIa metals, utilizing as an indicator a metal alkyl.

13. A process for neutralizing those impurities in a hydrocarbon medium which react with a metal alkyl-reducible halide of a metal chosen from the group consisting of group IVa, Va and VIa metals which process comprises colorimetrically titrating said hydrocarbon medium with titanium tetrachloride, utilizing as an indicator a metal alkyl.

14. The process of claim 13 wherein said indicator comprises triisobutylaluminum.

15. A process for purifying a hydrocarbon medium of impurities which will react with a metal alkyl-reducible halide of a metal chosen from the group consisting of group IVa, Va and VIa metals which process comprises colorimetrically titrating said hydrocarbon medium with a solution of a metal alkyl-reducible halide of a metal chosen from the group consisting of group IVa, Va and VIa metals, utilizing as an indicator a metal alkyl, and subsequently distilling said hydrocarbon medium under an inert atmosphere.

References Cited in the file of this patent

UNITED STATES PATENTS 2,133,452   Hewlett _____ Oct. 18, 1959

UNITED STATES PATENT OFFICE
CERTIFICATION OF CORRECTION

Patent No. 2,991,157                 July 4, 1961

Adam Orzechowski et al.

It is hereby certified that error appears in the above numbered patent requiring correction and that the said Letters Patent should read as corrected below.

Column 2, line 16, for "uilized" read -- utilized --; column 5, line 50, for "slution" read -- solution --; column 6, line 9, for "deocmpose" read -- decompose --; line 21, strike out "of", second occurrence; column 7, line 12, for "utilizing as an indicator a metal alkyl-reduci-" read -- consuming impurities which process comprises --.

Signed and sealed this 3rd day of April 1962.

(SEAL)
Attest:

ERNEST W. SWIDER
Attesting Officer

DAVID L. LADD
Commissioner of Patents